(12) United States Patent
Zarubica et al.

(10) Patent No.: US 10,356,843 B1
(45) Date of Patent: Jul. 16, 2019

(54) FREQUENCY BAND CONTROL ALGORITHM

(71) Applicant: L3 Technologies, Inc., New York, NY (US)

(72) Inventors: Radivoje Zarubica, Sandy, UT (US); Matthew J. Reimann, Draper, UT (US); Thomas R. Giallorenzi, Sandy, UT (US); Brent Kenney, Bountiful, UT (US); Jason Wilden, South Jordan, UT (US); Phillip M. Hirz, Holladay, UT (US)

(73) Assignee: L3 Technologies, Inc., New York, NY (US)

( * ) Notice: Subject to any disclaimer, the term of this patent is extended or adjusted under 35 U.S.C. 154(b) by 0 days.

(21) Appl. No.: 15/606,781

(22) Filed: May 26, 2017

(51) Int. Cl.
| | |
|---|---|
| *H04W 84/22* | (2009.01) |
| *G06F 15/173* | (2006.01) |
| *H04W 28/04* | (2009.01) |
| *H04W 40/12* | (2009.01) |
| *H04L 5/02* | (2006.01) |
| *H04L 1/00* | (2006.01) |
| *H04L 27/26* | (2006.01) |

(52) U.S. Cl.
CPC ...... *H04W 84/22* (2013.01); *G06F 15/17381* (2013.01); *H04L 1/0025* (2013.01); *H04L 5/026* (2013.01); *H04L 27/2673* (2013.01); *H04W 28/04* (2013.01); *H04W 40/12* (2013.01)

(58) Field of Classification Search
CPC ..... H04W 84/22; H04W 28/04; H04W 40/12; G06F 15/17381; H04L 1/0025; H04L 5/026; H04L 27/2673
See application file for complete search history.

(56) References Cited

U.S. PATENT DOCUMENTS

| | | | | |
|---|---|---|---|---|
| 2008/0095102 | A1* | 4/2008 | Meng | H04W 74/04 370/329 |
| 2008/0253386 | A1* | 10/2008 | Barum | H04L 45/00 370/406 |

(Continued)

*Primary Examiner* — Brandon M Renner
*Assistant Examiner* — Jay L Vogel
(74) *Attorney, Agent, or Firm* — Workman Nydegger

(57) ABSTRACT

Embodiments are directed to systems and methods for selecting appropriate transmission configurations in a mobile ad hoc frequency division duplexing mesh network. In one scenario, a node receives transmission parameters from a neighboring node, where the transmission parameters include an indication of the node's current transmission configuration. The node receives network parameters from neighboring nodes, where the network parameters include connection information describing the node's current network connection to the neighboring nodes. Then, based on the received transmission parameters and the received network parameters, the node calculates a change factor which indicates the desirability of changing transmission configuration. The node accesses the calculated change factor to determine whether the transmission configuration of the node is to be changed and, upon determining that the change factor indicates that the transmission configuration of the node should be changed, the transmission configuration of the node is changed to a second, different transmission configuration.

20 Claims, 8 Drawing Sheets

(56) References Cited

U.S. PATENT DOCUMENTS

| | | | |
|---|---|---|---|
| 2010/0211359 A1* | 8/2010 | Mehta | H04Q 9/00 |
| | | | 702/188 |
| 2011/0116432 A1* | 5/2011 | Doppler | H04B 7/155 |
| | | | 370/312 |
| 2011/0117852 A1* | 5/2011 | Copeland | H04W 48/08 |
| | | | 455/62 |
| 2012/0209808 A1* | 8/2012 | Tien | H04L 67/1095 |
| | | | 707/622 |
| 2012/0250595 A1* | 10/2012 | Farkas | H04W 52/241 |
| | | | 370/311 |
| 2014/0044022 A1* | 2/2014 | Matsuo | H04B 1/50 |
| | | | 370/278 |
| 2016/0135201 A1* | 5/2016 | Brahmi | H04L 5/006 |
| | | | 370/329 |
| 2017/0111905 A1* | 4/2017 | Sherman | H04W 16/28 |
| 2017/0346708 A1* | 11/2017 | Patil | H04L 43/16 |
| 2018/0183874 A1* | 6/2018 | Cook | H04L 67/12 |

* cited by examiner

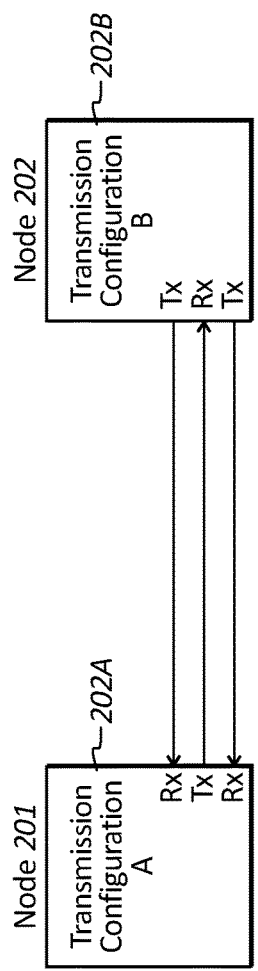
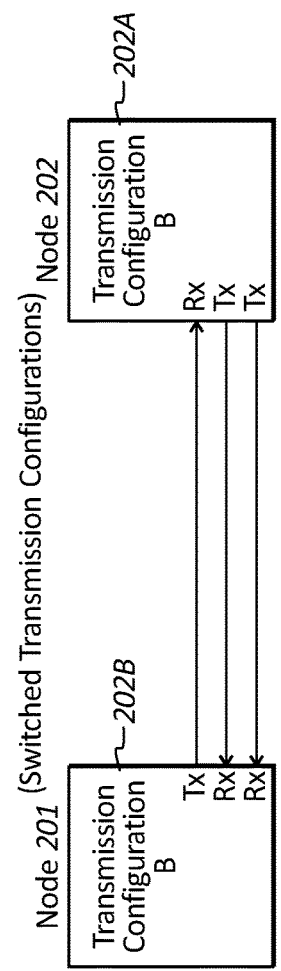
FIG. 2A
FIG. 2B

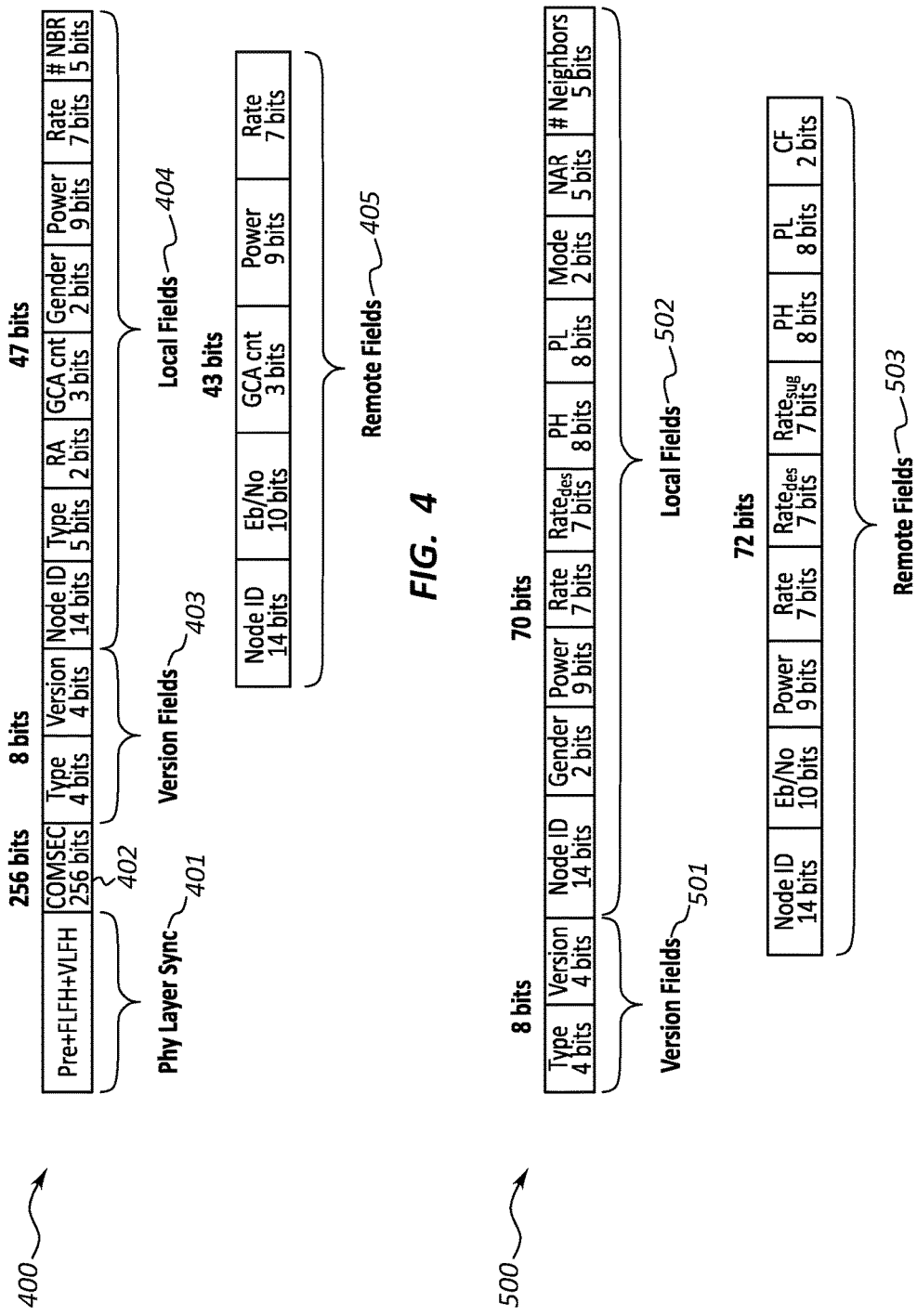

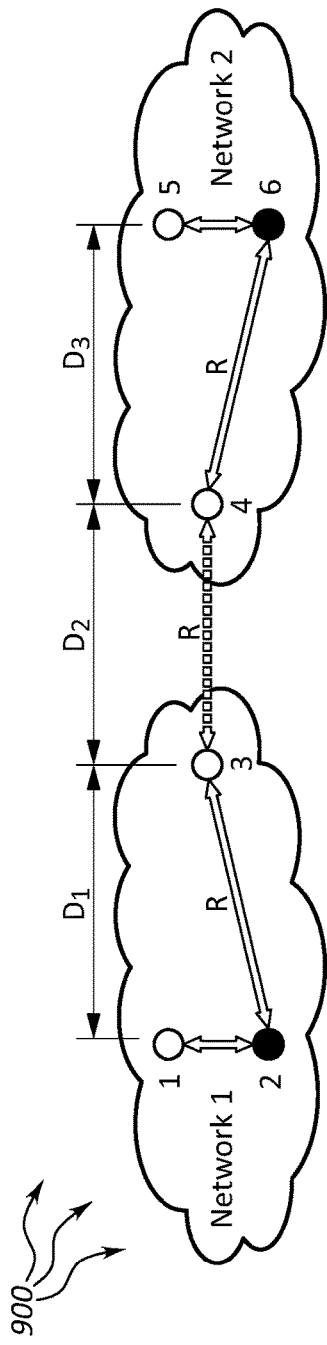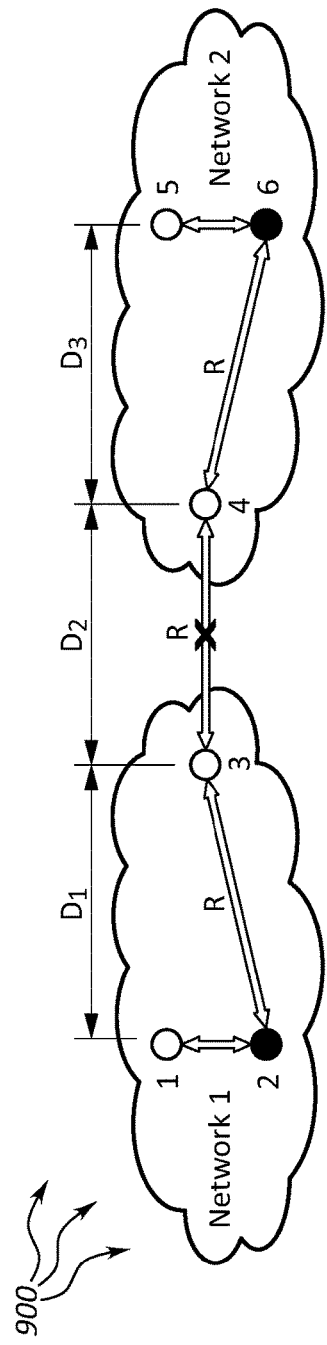
FIG. 9A
FIG. 9B

FREQUENCY BAND CONTROL ALGORITHM

BACKGROUND

Computing nodes communicate with each other using a variety of different data transmission and reception techniques. For instance, a network of nodes may use Frequency Division Duplexing (FDD) in which network nodes separate their transmission from their reception using different frequencies. Accordingly, each node typically uses one frequency to transmit signals and other frequencies to receive signals. The choice of transmit/receive frequency defines that node's transmission configuration (sometimes referred to as a node's gender).

Such FDD communication may occur in a various types of networks including a mobile ad hoc mesh network. Within mobile ad hoc mesh networks, however, two nodes can only hear each other if they are of differing transmission configurations. For example, if one node is transmitting at frequency A and receiving on frequency B, only nodes that are listening on frequency A and transmitting on frequency B would be able to talk to each other. Most of the existing Frequency Division Duplexing networks either pre-plan the transmission configuration of the nodes in the network, or there is a central network manager that commands nodes to switch transmission configuration when needed.

Within mobile ad hoc mesh networks, no central network manager exists. Rather, these mesh networks rely on communications between distributed nodes to maintain the integrity of the network. Switching between different transmission configurations can take time and processing resources, which are often limited in mobile devices. Thus, switching transmission configurations is typically only done when absolutely necessary. Moreover, configuration switches are often disruptive to the other nodes of the network. If, for example, first and second nodes are communicating, and the second node switches to a different configuration in order to talk to a third node, the second node will no longer be able to communicate with the first node, as they are now using the same transmission configuration. Current methods do not allow nodes to change configuration based on the environment they are observing and without being disruptive to the rest of the network.

BRIEF SUMMARY

Embodiments described herein are directed to systems and methods for selecting appropriate transmission configurations in a mobile ad hoc frequency division duplexing (FDD) mesh network. In one method, a node receives transmission parameters from neighboring nodes, where at least one of the transmission parameters includes an indication of the node's current transmission configuration. The node then receives network parameters from neighboring nodes, where the network parameters include connection information describing the node's current network connection to the neighboring nodes.

Then, based on the received transmission parameters and the received network parameters, the node calculates a change factor which indicates the desirability of changing transmission configuration. The node accesses the calculated change factor to determine whether the transmission configuration of the node is to be changed and, upon determining that the change factor indicates that the transmission configuration of the node should be changed, the transmission configuration of the node is changed to a second, different transmission configuration.

A system for selecting appropriate transmission configurations in a mobile ad hoc FDD mesh network may also be provided. The system includes at least one node that has a transceiver configured to receive transmission parameters from neighboring nodes. The transmission parameters include an indication of the first node's current transmission configuration. The transceiver is further configured to receive network parameters from neighboring nodes, where the network parameters include connection information describing the node's current network connection to the neighboring nodes.

The node of the system also includes a processor that is configured to perform the following autonomously based on network information: calculate, based on the received transmission parameters and the received network parameters, a change factor which indicates the desirability of changing transmission configuration at the first node, access the calculated change factor to determine whether the transmission configuration of the first node is to be changed and, upon determining that the change factor indicates that the transmission configuration of the node should be changed, changing the transmission configuration of the node to a second, different transmission configuration.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which:

FIG. 2A illustrates an embodiment of a first transmission configuration between two nodes.

FIG. 2B illustrates an embodiment of a second transmission configuration between two nodes.

FIG. 4 illustrates an embodiment showing the contents of an example beacon message.

FIG. 5 illustrates an embodiment showing the contents of an example primary node message.

FIG. 9A illustrates an embodiment in which two separate networks are probed for a potential merger.

FIG. 9B illustrates an alternative embodiment in which two separate networks are probed for a potential merger.

DETAILED DESCRIPTION

Figure 1:
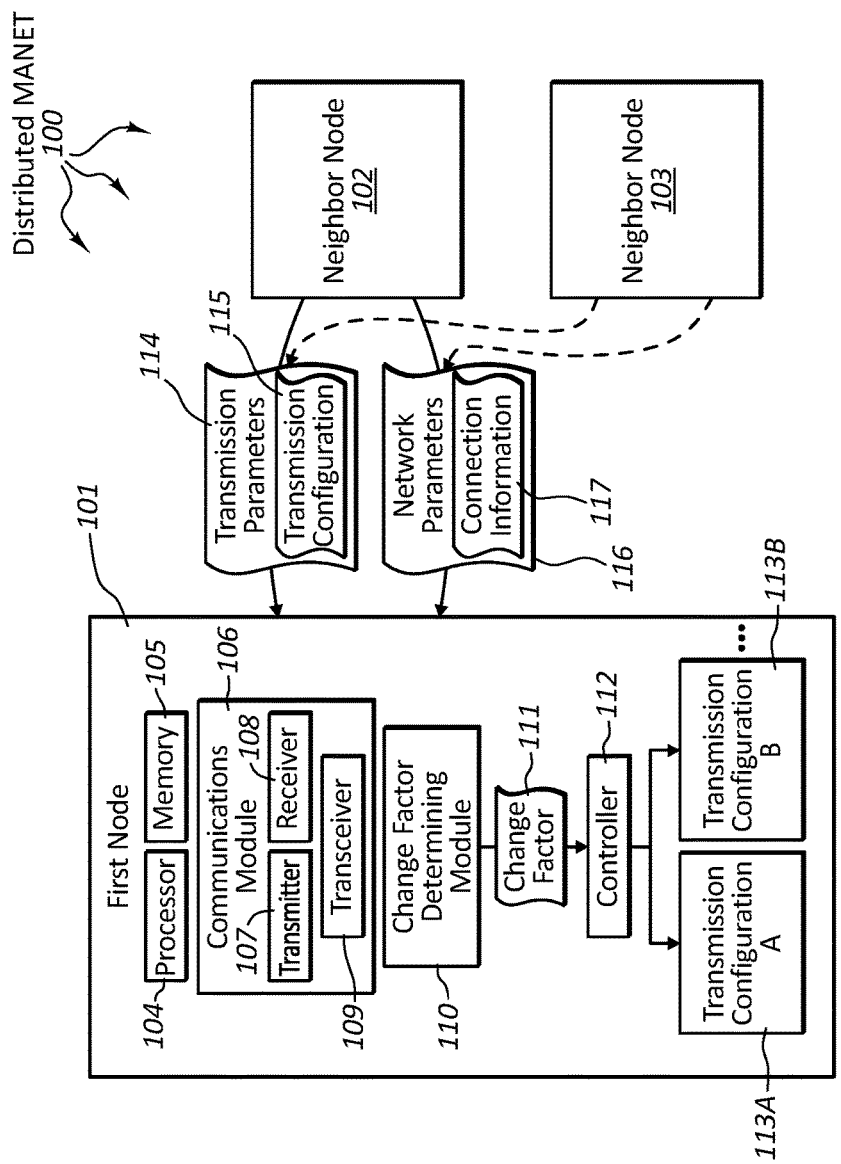
FIG. 1 illustrates a network architecture in which embodiments described herein may operate including selecting appropriate transmission configurations in a mobile ad hoc frequency division duplexing (FDD) mesh network.

Embodiments described herein are directed to systems and methods for selecting appropriate transmission configurations in a mobile ad hoc frequency division duplexing (FDD) mesh network. In one method, a node receives transmission parameters from neighboring nodes, where at least one of the transmission parameters includes an indication of the node's current transmission configuration. The node then receives network parameters from neighboring nodes, where the network parameters include connection information describing the node's current network connection to the neighboring nodes.

Then, based on the received transmission parameters and the received network parameters, the node calculates a change factor which indicates the desirability of changing transmission configuration. The node accesses the calculated change factor to determine whether the transmission configuration of the node is to be changed and, upon determining that the change factor indicates that the transmission configuration of the node should be changed, the transmission configuration of the node is changed to a second, different transmission configuration.

A system for selecting appropriate transmission configurations in a mobile ad hoc FDD mesh network may also be provided. The system includes at least one node that has a transceiver configured to receive transmission parameters from neighboring nodes. The transmission parameters include an indication of the first node's current transmission configuration. The transceiver is further configured to receive network parameters from neighboring nodes, where the network parameters include connection information describing the node's current network connection to the neighboring nodes.

The node of the system also includes a processor that is configured to perform the following: calculate, based on the received transmission parameters and the received network parameters, a change factor which indicates the desirability of changing transmission configuration at the first node, access the calculated change factor to determine whether the transmission configuration of the fist node is to be changed and, upon determining that the change factor indicates that the transmission configuration of the node should be changed, changing the transmission configuration of the node to a second, different transmission configuration.

Embodiments described herein may implement various types of computing systems. These computing systems are now increasingly taking a wide variety of forms. Computing systems may, for example, be mobile phones, electronic appliances, laptop computers, tablet computers, wearable devices, desktop computers, mainframes, and the like. As used herein, the term "computing system" includes any device, system, or combination thereof that includes at least one processor, and a physical and tangible computer-readable memory capable of having thereon computer-executable instructions that are executable by the processor. A computing system may be distributed over a network environment and may include multiple constituent computing systems (e.g. a cloud computing environment). In a cloud computing environment, program modules may be located in both local and remote memory storage devices.

As described herein, a computing system may also contain communication channels that allow the computing system to communicate with other message processors over a wired or wireless network. Such communication channels may include hardware-based receivers, transmitters or transceivers, which are configured to receive data, transmit data or perform both. Embodiments described herein also include physical computer-readable media for carrying or storing computer-executable instructions and/or data structures. Such computer-readable media can be any available physical media that can be accessed by a general-purpose or special-purpose computing system.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

Referring to the figures, FIG. 1 illustrates a network architecture 100 of a distributed mobile ad hoc network (MANET) in which at least one embodiment described herein may be employed. The network architecture 100 includes multiple nodes including nodes 101, 102 and 103. It will be understood, of course, that substantially any number of nodes may be included in the network. Node 101 includes at least one processor 104 and at least some system memory 105. The node 101 may be in any type of local or distributed network, including a mobile ad hoc mesh network. The node 101 includes modules for performing a variety of different functions.

For instance, communications module 106 may be configured to communicate with other nodes within the network 100 or within other networks. The communications module 106 may include any wired or wireless communication means that can receive and/or transmit data to or from other nodes. The communications module 106 may use a hardware transmitter 107 to transmit data, a hardware receiver 108 to receive data, and/or a hardware transceiver 109 which is configured to both transmit and receive data. Other communicating means may also be included in the communication module including radios such as WiFi radios, Bluetooth radios, global positioning system (GPS) radios, cellular radios or other communications systems. The communication module allows the node to interact with other nodes, along with potentially other devices or systems including databases, mobile computing devices (such as mobile phones or tablets), embedded systems or other types of devices.

In one embodiment herein, a system is provided for selecting appropriate transmission configurations in a mobile ad hoc frequency division duplexing (FDD) mesh network (e.g. network 100). The system has at least two nodes that communicate with each other. A first node in the system includes a transceiver 109 configured to receive transmission parameters 114 from a neighboring node (e.g. node 102 or node 103). At least one of the transmission parameters includes an indication of the first node's current transmission configuration 115. The nodes' transmission configuration refers to its current transmission (or receiving) setup, including an indication of which frequencies the node is using for transmitting data and which frequencies the node is using for receiving data. Often, the node will include two transmitting bands and one receiving band, or two receiving bands and one transmitting band.

For example, as shown in FIG. 2A, node 201 is currently equipped with transmission configuration A (202A), while node 202 is equipped with transmission configuration B (202B). Transmission configuration A has two receiving bands (i.e. Rx bands) and one transmitting band (Tx band), and transmission configuration B has two transmitting bands and one receiving band. In transmission configuration A, the two receiving bands may be on different frequencies, each listening for transmissions from the respective Tx bands of node 202. Similarly, the Rx band of node 202 may be configured to listen for transmissions from the Tx band of node 201. If the transmission configurations were the same for each node, then nodes 201 and 202 would both be transmitting on the same frequencies, and not listening to the proper frequencies. This would result in interfering transmission signals, and receivers tuned to the wrong frequency. Thus, if node 201 needs to change its transmission configuration, as shown in FIG. 2B, node 202 would similarly need to change its transmission configuration in order to hear (and be heard by) node 201.

It should be understood that while only two transmission configurations are illustrated in FIGS. 2A and 2B, substantially any number of Rx and Tx bands may be used by each node, and that each node may have multiple different potential transmission configurations. Thus, the switch may not simply be from A to B or B to A, but from transmission configuration A to D, or from D to C, and so on. Thus, determining which transmission configuration to use, and when to switch to a different configuration can utilize many CPU cycles and can take up memory space that could otherwise be used for other purposes. Thus, embodiments herein use network environment conditions and current node configurations to determine the optimal time to switch transmission configurations if needed, and which nodes make most sense to change within the network, so that changes among a particular group of nodes are minimized.

The transceiver 109 of the first node 101 is further configured to receive network parameters 116 from at least one neighboring node (e.g. node 102 or node 103). The network parameters 116 include connection information 117 describing the first node's current network connection to the at least one neighboring node (e.g. shown in FIG. 2A). A change factor determining module 110 of the first node 101 then calculates, based on the received transmission parameters 114 and the received network parameters 116, a change factor 111 which indicates the desirability of changing transmission configuration at the first node. If the change factor 111 indicates a low level of desirability, the transmission configuration will likely not be changed, while if the change factor indicates a high level of desirability, the transmission configuration will likely be changed.

A controller 112 of the first node 101 accesses the calculated change factor 111 to determine whether the transmission configuration of the fist node is to be changed. Then, upon determining that the change factor 111 indicates that the transmission configuration of the first node (e.g. 113A) should be changed, the controller 112 changes the transmission configuration of the first node to a second, different transmission configuration (e.g. 113B). The horizontal dots next to transmission configuration 113B indicate that many more transmission configurations are possible, and could be used in node 101. The other nodes in the distributed network 100 (e.g. 102 and 103) may include any or all of the same modules as node 101 in order to perform the functionality described herein. These concepts will be explained further below with regard to method 300 of FIG. 3, as well as the embodiments shown in FIGS. 4-12.

Figure 3:
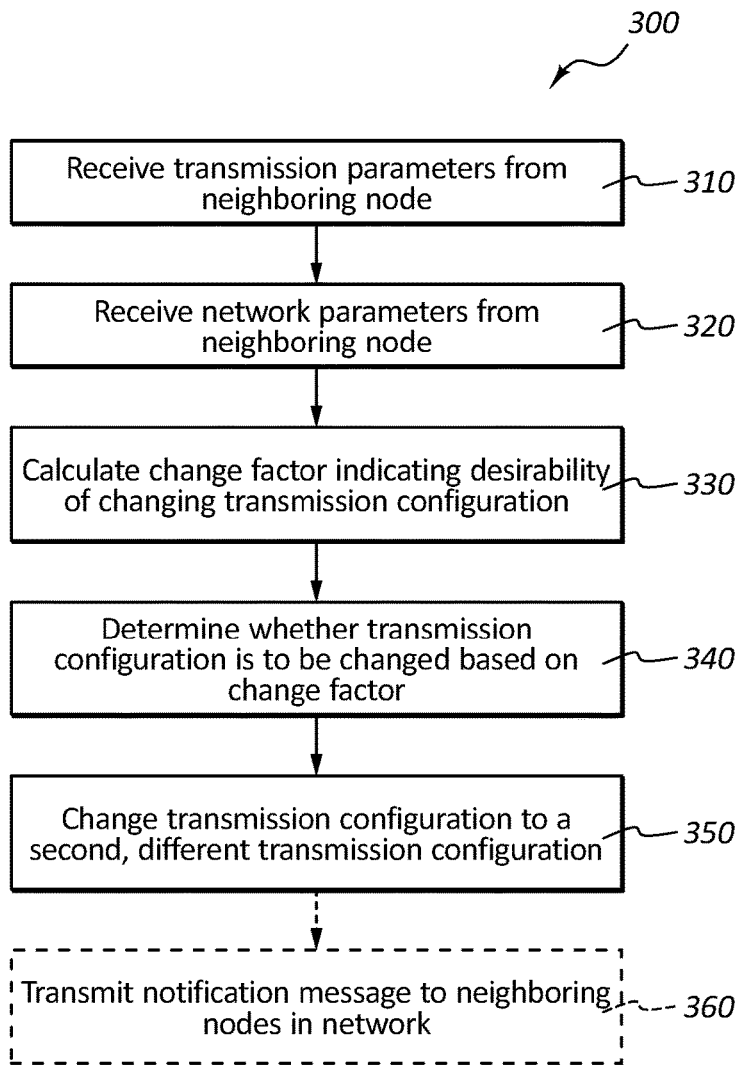
FIG. 3 illustrates a flowchart of an example method for selecting appropriate transmission configurations in a mobile ad hoc FDD mesh network.

In view of the systems and architectures described above, methodologies that may be implemented in accordance with the disclosed subject matter will be better appreciated with reference to the flow chart of FIG. 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 3 illustrates a flowchart of a method 300 for selecting appropriate transmission configurations in a mobile ad hoc frequency division duplexing (FDD) mesh network. The method 300 will now be described with frequent reference to the components and data of network environment 100.

Method 300 includes receiving, at a first node, one or more transmission parameters from at least one neighboring node, at least one of the transmission parameters including an indication of the first node's current transmission configuration (310). For example, first node 101 may receive transmission parameters 114 from neighboring node 102 (or from other neighboring nodes). The transmission parameters may include an indication of the first node 101's current transmission configuration 115. This transmission configuration may refer to the power level at which node 101 is transmitting, the data rate, the Tx bands it is transmitting on, the transmission configuration (e.g. 202A or 202B from FIG. 2), signal-to-noise ratio (SNR), node neighborhood information, or other information identified by the neighboring node 102.

This information may be sent to node 101 so that node 101 will be aware of how it is being viewed and received by other nodes in the distributed MANET 100. Other information may also be provided by the neighboring nodes including node identifiers, version identifiers, communication security information and other data. In FIG. 4, for example, an example embodiment of a beacon message 400 is shown. The beacon message 400 includes multiple different fields including a physical layer synchronization field 401, a communication security field 402, version fields 403, local fields 404 and remote fields 405. While each of these fields is shown as having a specified amount of bits, it will be understood of course that other amounts of bits may be used in each field. Moreover, different fields may be added or omitted to the beacon message 400 as needed.

Method 300 next includes receiving, at the first node, one or more network parameters from at least one neighboring node, wherein the network parameters include connection information describing the first node's current network connection to the at least one neighboring node (320). Node 101, for instance, may receive network parameters 116 from neighboring node 102. These network parameters may be sent alone or in conjunction with the transmission parameters. The network parameters include connection information 117 that provides details regarding node 101's connection to node 102 and/or to other nodes in the distributed MANET 100. The connection information 117 may list current connections indicating which nodes are connected to node 101 or node 102, whether the connections are one-way or two-way, what other nodes each node is aware of within the distributed network how many hops away those nodes are.

As shown in FIG. 5, message 500 may include version fields 501, local fields 502 and remote fields 503. As with the fields of message 400, the fields of message 500 may include substantially any number of bits, and the message itself may include any number or combination of field types. In some embodiments, the beacon message 400 of FIG. 4 may correspond to the transmission parameters message 114, and the network parameters message may correspond to message 500 of FIG. 5. Optionally, some of the information provided in message 400 may be provided in message 500, or vice versa.

Based on these received transmission parameters 114 and network parameters 116, the change factor determining module (either alone using its own special purpose microprocessor, or in conjunction with processor 104) calculates, for at least the first node 101 in the mobile ad hoc FDD mesh network 100, a change factor 111 which indicates the desirability of changing transmission configuration (330). As noted above, it may be necessary or desirable in some instances to change a node's transmission configuration. In binary situations where there are only two different transmission configurations being used within a network (such as in FIGS. 2A and 2B), the decision may simply be whether to switch from transmission configuration 202A to 202B. In other cases, where more than two transmission configurations are implemented in a network, the decision of when to change and which transmission configuration to change to may be made based on the change factor 111.

The change factor determining module 110 may analyze the transmission parameters 114 and network parameters 116 including the power level at which nodes are transmitting, the data rate, the Tx and Rx bands currently implemented, the transmission configuration, SNR, node neighborhood information, list of current connections, whether the connections are one-way or two-way, what other nodes are known, and how many hops away those nodes are. Any one or more of these measurements or indicators may be used by the change factor determining module 110 to raise or lower the desirability of changing transmission configuration. A node's power level, SNR, place in the network, number of hops to other nodes, etc. may affect the decision as to whether a particular node should keep its current transmission configuration or whether it should change. This determination may be made on a continual or periodic basis for each node, or based on the occurrence of an event.

Method 300 further includes accessing the calculated change factor 111 to determine whether the transmission configuration of the first node is to be changed (340) and, upon determining that the change factor indicates that the transmission configuration of the first node should be changed, the transmission configuration of the first node is changed to a second, different transmission configuration (350). For example, the controller 112 may change node 101 from transmission configuration 113A to transmission configuration 113B. The controller may thus have access to the Tx and Rx bands used by the communication module 106, and may change those bands to different frequencies, or may change which bands are used in line with the chosen transmission configuration.

Figure 6:
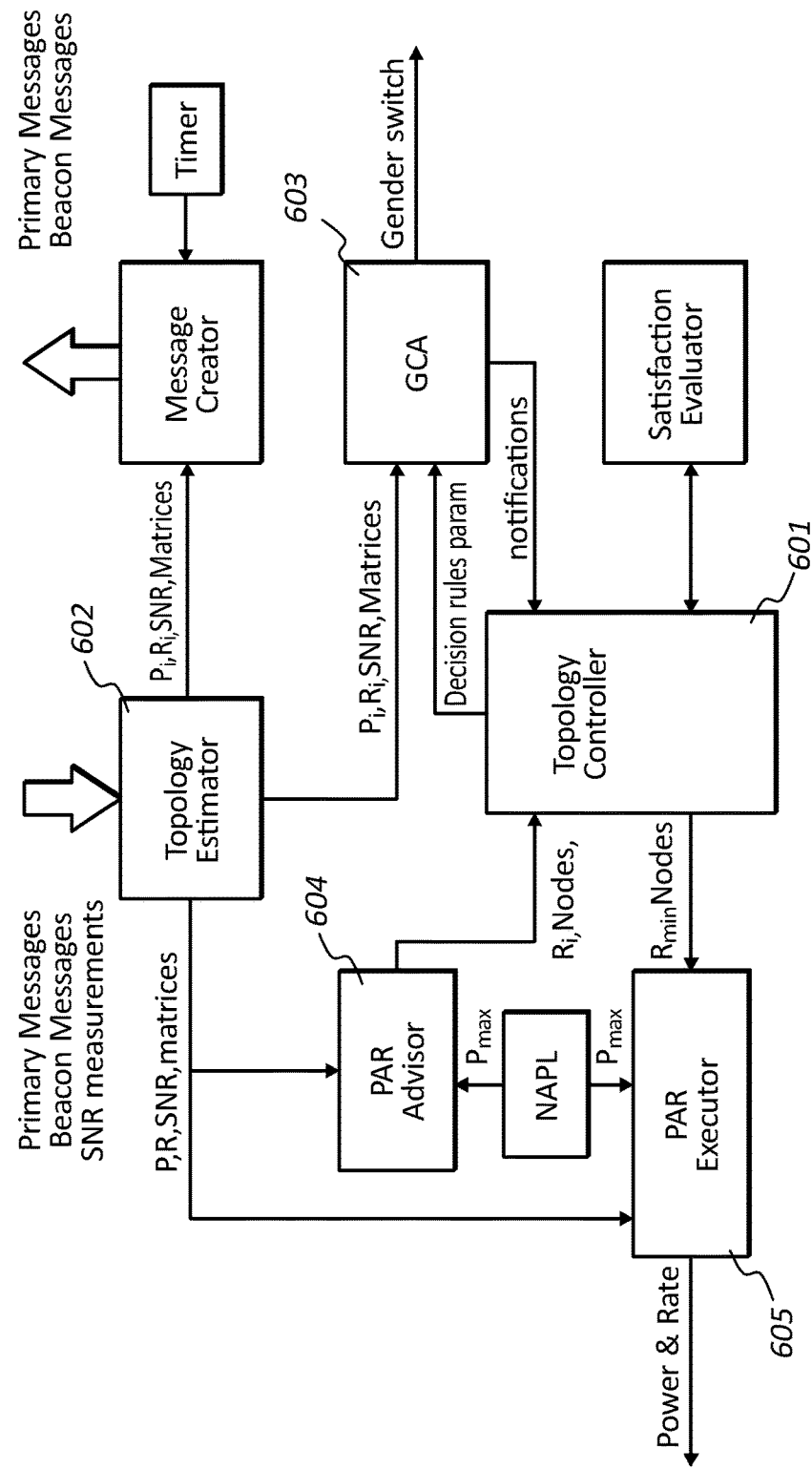
FIG. 6 illustrates an embodiment of a topology controller and associated components.
Figure 7:
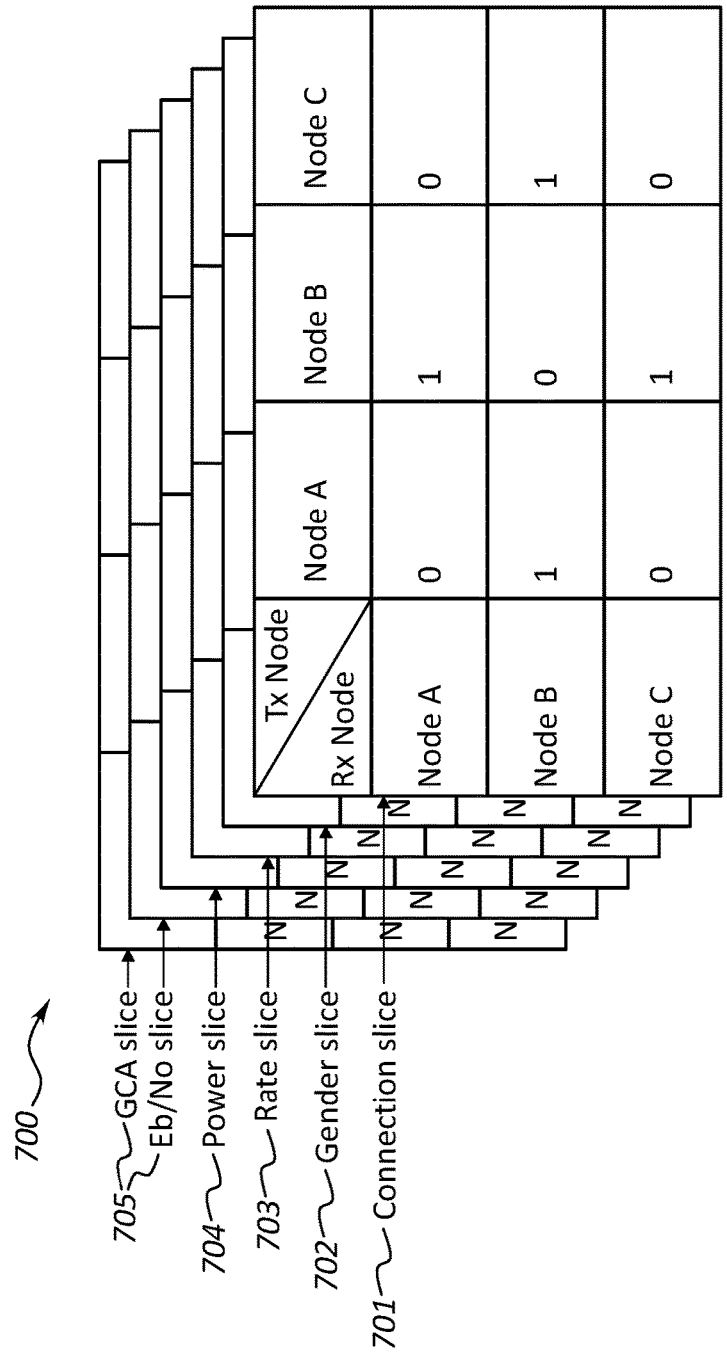
FIG. 7 illustrates an embodiment of an estimated network matrix three-dimensional array.

As shown in FIG. 6, a topology controller 601 may be provided which functions similar to or the same as controller 112 of FIG. 1. The topology controller 601 looks at multiple factors including power, data rate, SNR, and other factors. The topology estimator 602 may access or create matrices 700 of FIG. 7. The matrices 700 include different rows, columns, and slices for the various nodes and node factors. For example, the connection slice 701 shows which Tx nodes A-C and which Rx nodes A-C are currently enabled. As can be seen from the matrix 700, Rx node A and Tx node B can communicate with each other, as can Rx node B and Tx node A and Rx node B and Tx node C, and so on. Other factors including transmission configuration (gender) 702, data rate 703, power 704 and other slices 705 may be included in the matrix. The gender change module 603 may determine that a given node's gender is to be switched, and may make that switch.

As can be seen from FIG. 6, the topology controller 601 and/or the gender change module 603 may use decision rules with various parameters to make the decision as to whether to change transmission configurations or not. These parameters may be provided by or accessed through the power and rate (PAR) advisor 604 or the topology controller 601. The PAR executor 605 may implement changes to the power and rate of the node's transmissions, while the topology controller 601 evaluates and controls the transmission configuration states of the nodes in the network. Each parameter accessed by the topology controller 601 may have a threshold limit which, upon being reached, causes the transmission configurations to be switched. In some cases, many different factors may be measured and compared (as in the matrix 700) in order to determine whether and when transmission configuration switches should be performed.

In at least some embodiments, the first node 101 and neighboring nodes 102 and 103 in the mobile ad hoc FDD mesh network each implement three bands including a transmit band and two receive bands or two transmit bands and a single receive band. Transmission parameters 114 are received in a primary node message (e.g. 400 of FIG. 4) and are stored in a database table for node messages received from neighboring nodes. Similarly, network parameters 116 may be received in a beacon message (e.g. 500 of FIG. 5) and may be stored in a separate database table for beacon messages. In this manner, current and past transmission parameters 114 and network parameters 116 may be stored in databases and compared to see how the parameters have changed over time. Senders of beacon messages may form a beacon network within the mobile ad hoc FDD mesh network. This beacon network may assist in identifying other nodes within the distributed network.

When a change factor is determined for a given node in the network, the change factor may be calculated for at least three different types of scenarios. In a first scenario, a change factor 111 is calculated for an empty neighborhood with no current connections. In such cases, the change factor determining module of the node determines whether to switch alignment to find other nodes, as it is currently perceiving an empty neighborhood and cannot communicate with other nodes. It may be that the other nodes have the same transmission configuration, and thus the node will not be able to communicate with the other nodes until it switches transmission configurations.

In a second scenario, the change factor is calculated to substantially balance transmission configuration distribution within the mobile ad hoc FDD mesh network. In this scenario, different nodes have differing transmissions within the network. The change factor is calculated to balance different genders among the network. The change factor determining module 110 looks at counts of each type, and attempts to even out the number of transmission configurations without breaking other connections. If two nodes are both deciding that a gender change is desirable, each node may perform tiebreaker operation (e.g. based on node ID) to determine which node will make the switch.

Each node in the network may be configured to generate a database table that identifies counts of its two-hop neighbors (i.e. counts of uniband, dual band and tri band), and indicates whether the nodes are in the majority or minority. In such cases, only majority nodes will change. In other words, each node will determine if it is in majority, and if yes, can the node change genders without breaking other connections in the network. Other rules may also apply, such as whether the node is in a sufficient majority (greater than the minority by at least two, etc.), or whether sufficient time passed since the node's last band switch. In one example, if there are six nodes, a 2-2-2 spread may be the ideal, balanced scenario, but in some cases, there may be less incentive to change if connections will break in the process of creating the 2-2-2 balanced distribution.

In a third scenario, the change factor 111 is calculated to avoid signal jamming within the mobile ad hoc FDD mesh network. Transmission configuration may be changed for a node to avoid jamming or other signal interference. The change factor determining module 110 may look at power rate, data rate, SNR and/or information from other messages and evaluate, on a network-wide basis, which type of change to make to which nodes. This determination takes into account how the change would affect other nodes in the network, and may further evaluate how the change would affect maximum throughput of the entire network.

In some cases, calculating, for at least the first node in the mobile ad hoc FDD mesh network, a change factor which indicates the desirability of changing transmission configuration also includes calculating a signal-to-noise ratio for each transmit or receive band. The signal-to-noise ratio may be used in determining whether a switch to a new transmission configuration would be optimal. Calculating a change factor may also include calculating a power measurement for each transmit or receive band. This power measurement may similarly be used as a factor in determining whether to change transmission configurations. Each node may be able to estimate an amount of power received from other incoming signals. For example, jammers or other devices may emit signals that would interfere with the transmission output of a node or group of nodes. When performing these power measurements for incoming signals, each node may be able to see and calculate its own 2-hop neighborhood.

Figure 8A:
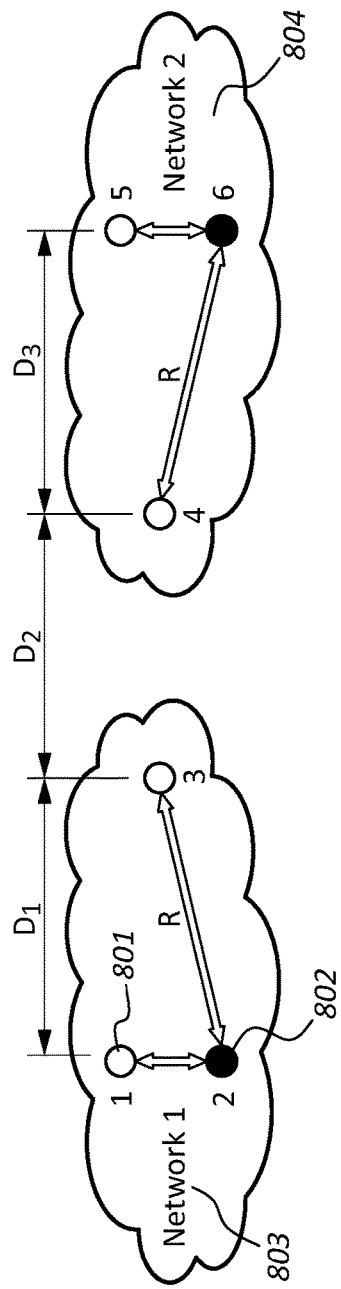
FIG. 8A illustrates an embodiment in which two separate networks may be merged.
Figure 8B:
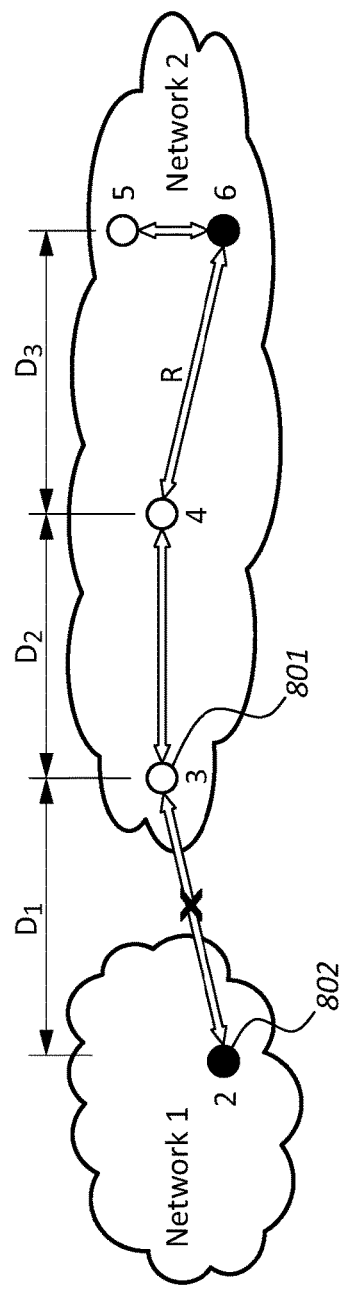
FIG. 8B illustrates an alternative embodiment in which two separate networks may be merged.

For example, as shown in FIG. 8A, hollow circles 801 (e.g. 1, 3, 4 and 5) may be of one transmission configuration, while solid circles 802 (e.g. 2 and 6) may be of another transmission configuration. Node 1, for instance, may be able to see node 2 (as it is the opposite transmission configuration), and may be aware of node 3 (its 2-hop neighbor). Nodes 3 and 4 may not be aware of each other as they are the same transmission configuration. Networks 1 and 2 could be potentially merged by changing the transmission configuration for nodes 3 or 4. However, as shown in FIG. 8B, when node 3 changes transmission configuration, it can no longer communicate with node 2, but can communicate with node 4. It should also be noted that networks 1 and 2 can be merged through gender switching only if nodes 1 or 5 exist. Nonexistence of nodes 1 or 5 would cause the switched node to join the neighboring network while the two networks would still be fragmented (see FIG. 8B).

In some embodiments, the processor 104 of node 101 may be further configured to estimate a signal-to-noise ratio that would occur if the transmission configuration of the node 101 were to be changed, according to determined feedback levels from neighboring nodes. For instance, a transmission configuration switch could be beneficial or detrimental based on the estimated SNR. The estimated SNR may be generated based on feedback levels from other neighboring nodes. Node 101 may, for example, receive an estimated SNR from other nodes indicating what the estimated SNR would be if node 101 switched to a different receive channel. The estimated SNR may indicate that signal strength would increase if the transmission configuration were switched. Moreover, feedback from multiple nodes may be combined and the decision to switch may then be made based on the combined feedback.

FIGS. 9A and 9B illustrate an embodiment 900 where the processor of node 101 is further configured to send network probe messages that are transmitted with higher power to reach other neighboring nodes listening to the first node's transmit channel. If the distance D2 between nodes 3 and 4 in FIG. 9A is too great, for example, regular-power messages will not have the strength to reach node 4 in Network 2. A higher powered message may be sent from node 3 to node 4, but because they share the same transmission configuration, nodes 3 and 4 will still not be able to communicate (FIG. 9B). In a network probing embodiment, either node 3 or node 4 may temporarily switch transmission configuration so as to be able to detect nodes of other transmission configurations.

If node 3 switches gender, it learns about nodes 4 and 6 (via 4) and nodes 1 and 2 (via node 1). In this situation, node 3 would like to switch transmission configuration because it learned that it can connect to more nodes when in a different configuration. However, node 4 would also need to switch configurations and, as mentioned above, if they both switch, the networks will not merge. In order to coordinate transmission configuration switching between nodes 3 and 4 of FIG. 9A, a beacon network may be established to provide a way for these nodes to be aware of each other and also of their intentions to change or not change configurations. Using a beacon network, node 3 can learn about node 4 via node 6 (or node 4 learns about node 3 via node 2).

Thus, in this manner, a beacon network (that uses time division multiplexing (TDM), for example) can be used to synchronize transmission configuration changes in the network. Such a beacon network can be used if neither beacon from node 3 can reach node 6 or if beacon from node 4 can reach node 2. If networks 1 and 2 are to be merged, thereby combining nodes 1-6 into a single network, they can be merged at rate R at distance D2. The distance D3 where a beacon message from node 3 would not reach node 6 is D3>D2*(sqrt(R/R0)−1), where R0 is the beacon data rate. Also, in this embodiment, D1<=D2 because node 3 needs to reach node 2 with the same data rate R. Applying the same principle for node 4, in this embodiment the limiting factor is D1=D2=D3 and that happens when R=4*R0=16 kbps. Thus, if a node data rate is 16 kbps, its beacon would be able to reach twice the merging distance (or twice the distance to the closest connected node).

The processor 104 of node 101 in FIG. 1 may be further configured to create a list of potential transmission configuration changes that could be applied to nodes within the network. This list may be continually evaluated to determine whether a superior transmission configuration exists and, if so, to make the change. The PAR advisor of FIG. 6 may perform estimations using the SNR inputs from the other nodes, and the topology estimator may determine whether to make changes by accessing or creating the list of possible changes and evaluating those possibilities. At each iteration, the topology estimator may determine what the network topology would look like if certain transmission configuration changes were made.

The estimator can thus determine what would happen if one node changes its configuration and how it will affect the other nodes, and can further look at SNR feedback and other indicators that indicate whether it is desirable to switch. Optimizations may be implemented where such iterations are performed sparingly based on certain parameters to conserve processing power and battery life when mobile.

If the topology estimator determines that changes are to be made, the identified superior transmission configuration changes are implemented one node at a time within the mobile ad hoc FDD mesh network. These incremental (and minimal changes) ensure that minimal disruption occurs to the network. In an optional method step 360, the processor may be further configured to notify other neighboring nodes of changes to the transmission configuration. The node 101 may transmit notification messages to one or more neighboring nodes in the FDD mesh network, thereby notifying the neighboring nodes of the change in transmission configuration. Node 101 may also be configured to listen for notifications from neighboring nodes in the network indicating transmission configuration changes that have occurred on those nodes.

Optionally, node 101 may also be configured to perform conflict resolution to prevent multiple nodes in a single neighborhood from changing transmissions configurations at the same time. If multiple changes occurred within a short timeframe, communication conflicts could occur, and the network would have to adapt again, thereby consuming resources. Node 101 may provide information to the routing protocols in advance such that if a node advertises a transmission configuration switch, the other nodes would start calculating other possible routes to their destinations.

The embodiments herein may be operated on substantially any type of distributed network, including a code division multiple access (CDMA) network. Traditionally, transmission configuration changes in the networks have been performed in a centralized fashion where a central network manager collects various data about the network and decides that it might be beneficial to change configuration of some of the nodes in the network. Communicating network maintenance information to a central network manager has multiple drawbacks: it adds to communication overhead that might be substantial in cases of low data rate networks in contested or signal-denied environments. Moreover, it creates single point of failure. The embodiments herein eliminate both of these drawbacks as there is no central place that all the data is sent, and because each node in the network can make decisions about its own transmission configuration.

Accordingly, methods and systems and computer program products are provided which select appropriate transmission configurations in a mobile ad hoc frequency division duplexing mesh network. The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

We claim:

1. A distributed method for selecting appropriate transmission configurations in a mobile ad hoc frequency division duplexing (FDD) mesh network, the method comprising:

receiving, at a first node, one or more transmission parameters from at least one neighboring node, at least one of the transmission parameters including an indication of the first node's current, first transmission configuration, including an indication of a transmitting band first frequency and a receiving band second frequency wherein the first node performs single-hop bidirectional communication with one or more nodes having a second transmission configuration, wherein the second transmission configuration is an opposite transmission configuration including a transmitting frequency that is the second frequency and a receiving frequency that is the first frequency, informing the first node about how it is being viewed by other nodes in the network; receiving, at the first node, one or more network parameters from at least one neighboring node, wherein the network parameters include connection information describing the first node's current network connection to the at least one neighboring node;

based on the received transmission parameters and the received network parameters, calculating, for at least the first node in the mobile ad hoc FDD mesh network, a change factor which indicates the desirability of changing transmission configuration, including changing the current transmission configuration to the opposite, second transmission configuration;

accessing the calculated change factor to determine whether the transmission configuration of the fist node is to be changed;

and upon determining that the change factor indicates that the transmission configuration of the first node should be changed, changing the transmission configuration of the first node from the first current transmission configuration to the second, transmission configuration causing the first node to perform single-hop bidirectional communication with one or more different nodes than the first node previously communicated with in single-hop bidirectional communication and preventing the first node from performing single-hop bidirectional communication with the one or more nodes having a second transmission configuration that the first node previously communicated with.

2. The method of claim 1, wherein at least the first node and one or more neighboring nodes in the mobile ad hoc FDD mesh network has three bands including a transmit band and two receive bands or two transmit bands and a single receive band.

3. The method of claim 1, wherein the transmission parameters are received in a primary node message and are stored in a database table for node messages received from neighboring nodes.

4. The method of claim 1, wherein the network parameters are received in a beacon message and are stored in a separate database table for beacon messages.

5. The method of claim 4, wherein senders of beacon messages form a beacon network within the mobile ad hoc FDD mesh network.

6. The method of claim 1, wherein the change factor which indicates the desirability of changing transmission configuration is calculated for an empty neighborhood with no current connections.

7. The method of claim 1, further comprising counting each type of transmission configuration, wherein the change factor which indicates the desirability of changing transmission configuration is calculated to even out the number of each type of transmission configuration within the mobile ad hoc FDD mesh network.

8. The method of claim 1, wherein the change factor which indicates the desirability of changing transmission configuration is calculated to avoid signal jamming within the mobile ad hoc FDD mesh network.

9. The method of claim 1, wherein calculating, for at least the first node in the mobile ad hoc FDD mesh network, a change factor which indicates the desirability of changing transmission configuration further includes calculating a signal-to-noise ratio (SNR) for each transmitting band or receiving band.

10. The method of claim 1, wherein calculating, for at least the first node in the mobile ad hoc FDD mesh network, a change factor which indicates the desirability of changing transmission configuration further includes calculating a power measurement for each transmitting band or receiving band.

11. A system for selecting appropriate transmission configurations in a mobile ad hoc frequency division duplexing (FDD) mesh network, the system having a first node comprising: a transceiver configured to receive one or more transmission parameters from at least one neighboring node, at least one of the transmission parameters including an indication of the first node's current, first transmission configuration, including an indication of a transmitting band first frequency and a receiving band second frequency wherein the first node performs single-hop bidirectional communication with one or more nodes having a second transmission configuration, wherein the second transmission configuration is an opposite transmission configuration including a transmitting frequency that is the second frequency and a receiving frequency that is the first frequency, informing the first node about how it is being viewed by other nodes in the network; and further configured to receive one or more network parameters from at least one neighboring node, wherein the network parameters include connection information describing the first node's current network connection to the at least one neighboring node;

And a processor configured to perform the following:
calculate, based on the received transmission parameters and the received network parameters, a change factor which indicates the desirability of changing transmission configuration at the first node, including changing the current transmission configuration to the opposite, second transmission configuration;
access the calculated change factor to determine whether the transmission configuration of the fist node is to be changed;
and upon determining that the change factor indicates that the transmission configuration of the first node should be changed, changing the transmission configuration of the first node from the first current transmission configuration to the second, transmission configuration causing the first node to perform single-hop bidirectional communication with one or more different nodes than the first node previously communicated with in single-hop bidirectional communication and preventing the first node from performing single-hop bidirectional communication with the one or more nodes having a second transmission configuration that the first node previously communicated with.

12. The system of claim 11, wherein the processor is further configured to estimate an amount of power received from other incoming signals.

13. The system of claim 11, wherein the processor is further configured to estimate a signal-to-noise ratio that would occur if the transmission configuration of the first node were to be changed, according to determined feedback levels from neighboring nodes.

14. The system of claim 11, wherein the processor is further configured to send one or more network probe messages that are transmitted with higher power than other message transmissions transmitted by the processor to reach other neighboring nodes listening to the first node's transmit channel.

15. The system of claim 11, wherein the processor is further configured to create a list of potential transmission configuration changes, and continually evaluate the list of potential transmission configuration changes for superior transmission configuration changes.

16. The system of claim 15, wherein identified superior transmission configuration changes are implemented one node at a time within the mobile ad hoc FDD mesh network.

17. The system of claim 11, wherein the processor is further configured to notify one or more other neighboring nodes of changes to the transmission configuration.

18. A method for selecting appropriate transmission configurations in a code division multiple access (CDMA) frequency division duplexing (FDD) mesh network, the method comprising:
receiving, at a first node, one or more transmission parameters from at least one neighboring node, at least one of the transmission parameters including an indication of the first node's current, first transmission configuration, including an indication of a transmitting band first frequency and a receiving band second frequency wherein the first node performs single-hop bidirectional communication with one or more nodes having a second transmission configuration, wherein the second transmission configuration is an opposite transmission configuration including a transmitting frequency that is the second frequency and a receiving frequency that is the first frequency,
informing the first node about how it is being viewed by other nodes in the network; receiving, at the first node, one or more network parameters from at least one neighboring node, wherein the network parameters include connection information describing the first node's current network connection to the at least one neighboring node;
based on the received transmission parameters and the received network parameters, calculating, for at least the first node in the mobile ad hoc FDD mesh network, a change factor which indicates the desirability of changing transmission configuration, including changing the current transmission configuration to the opposite, second transmission configuration;
accessing the calculated change factor to determine whether the transmission configuration of the fist node is to be changed;
upon determining that the change factor indicates that the transmission configuration of the first node should be changed, changing the transmission configuration of the first node from the first current transmission configuration to the second, transmission configuration causing the first node to perform single-hop bidirectional communication with one or more different nodes than the first node previously communicated with in single-hop bidirectional communication and preventing the first node from performing single-hop bidirectional communication with the one or more nodes having a second transmission configuration that the first node previously communicated with; and transmitting one or more notification messages to one or more neighboring nodes in the CDMA FDD mesh network, notifying the neighboring nodes of the change in transmission configuration.

19. The method of claim 18, further comprising listening for notifications from neighboring nodes in the CDMA FDD mesh network indicating transmission configuration changes that have occurred on those nodes.

20. The method of claim 18, further comprising performing conflict resolution to prevent multiple nodes in a single neighborhood from changing transmissions configurations at the same time.

* * * * *